United States Patent
Kwon et al.

(10) Patent No.: US 12,335,929 B2
(45) Date of Patent: Jun. 17, 2025

(54) SCHEDULING AND BANDWIDTH PART ADAPTATION TECHNIQUES FOR EXTENDED REALITY

(71) Applicant: QUALCOMM Incorporated, San Diego, CA (US)

(72) Inventors: Hwan Joon Kwon, San Diego, CA (US); Huilin Xu, Temecula, CA (US); Yuchul Kim, San Diego, CA (US); Peter Pui Lok Ang, San Diego, CA (US); Yeliz Tokgoz, San Diego, CA (US); Jay Kumar Sundararajan, San Diego, CA (US); Krishna Kiran Mukkavilli, San Diego, CA (US); Tingfang Ji, San Diego, CA (US); Jing Lei, San Diego, CA (US); Ravi Agarwal, San Diego, CA (US); Seyong Park, San Diego, CA (US); Seyedkianoush Hosseini, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 18/620,279

(22) Filed: Mar. 28, 2024

(65) Prior Publication Data

US 2024/0244600 A1     Jul. 18, 2024

Related U.S. Application Data

(62) Division of application No. 17/228,036, filed on Apr. 12, 2021, now Pat. No. 11,974,256.

(Continued)

(51) Int. Cl.
*H04W 72/0446*  (2023.01)
*H04L 1/16*  (2023.01)
*H04W 76/28*  (2018.01)

(52) U.S. Cl.
CPC .......... *H04W 72/0446* (2013.01); *H04L 1/16* (2013.01); *H04W 76/28* (2018.02)

(58) Field of Classification Search
CPC ...... H04W 72/0446; H04W 76/28; H04L 1/16
(Continued)

(56) References Cited

U.S. PATENT DOCUMENTS

| 12,035,333 B2 * | 7/2024 | Hayashi | ................ H04W 48/12 |
| 2015/0215825 A1 * | 7/2015 | Kim | ................. H04W 36/0094 |
| | | | 370/331 |

(Continued)

FOREIGN PATENT DOCUMENTS

| CN | 110365458 A | 10/2019 |
| WO | 2020068253 A2 | 4/2020 |

OTHER PUBLICATIONS

Apple Inc: "Traffic Aware UE Power Saving Techniques with UE Assistance," 3GPP Draft, 3GPP TSG RAN WG1 #98b, R1-1910975, Traffic Aware UE Power Saving Techniques with UE Assistance, 3rd Generation Partnership Project (3GPP), Mobile Competence Centre, 650, Route Des Lucioles, F-06921, Sophia-Antipolis Cedex, France, vol. RAN WG1. No. Chongqing, China, Oct. 14, 2019-Oct. 18, 2019, Oct. 5, 2019 (Oct. 5, 2019), XP051808769, 5 pages.

(Continued)

*Primary Examiner* — Faisal Choudhury
(74) *Attorney, Agent, or Firm* — Patterson & Sheridan, L.L.P.

(57) ABSTRACT

Certain aspects of the present disclosure provide techniques for scheduling and bandwidth part (BWP) adaptation for extended reality (XR). A method that may be performed by (Continued)

a user equipment (UE) includes obtaining an indication to change at least one of a minimum control-channel-to-data-channel delay or a bandwidth for receiving a first transmission on a BWP; changing the at least one of the minimum control-channel-to-data-channel delay to a new minimum control-channel-to-data-channel delay or the bandwidth on the BWP to a new bandwidth; and receiving the first transmission on the BWP using the at least one of the new minimum control-channel-to-data-channel delay or the new bandwidth of the BWP.

20 Claims, 13 Drawing Sheets

Related U.S. Application Data

(60) Provisional application No. 63/009,411, filed on Apr. 13, 2020.

(58) Field of Classification Search
 USPC .......................................................... 370/329
 See application file for complete search history.

(56) References Cited

U.S. PATENT DOCUMENTS

| | | | | |
|---|---|---|---|---|
| 2015/0215989 | A1* | 7/2015 | Bangolae | H04W 48/20 370/311 |
| 2019/0281545 | A1 | 9/2019 | Kim et al. | |
| 2021/0136689 | A1* | 5/2021 | Kim | H04W 24/08 |
| 2021/0321398 | A1 | 10/2021 | Kwon et al. | |
| 2022/0140985 | A1* | 5/2022 | Li | H04W 52/0216 370/329 |

OTHER PUBLICATIONS

International Preliminary Report on Patentability—PCT/US2021/027048, The International Bureau of WIPO—Geneva, Switzerland, Oct. 27, 2022.

International Search Report and Written Opinion—PCT/US2021/027048—ISA/EPO—Jul. 22, 2021.

Mediatek Inc: "Remaining Issues on Bandwidth Part in R15 NR," 3GPP Draft, 3GPP TSG RAN WG1 Meeting #95, R1-1812341_Remaining Issues on BWP in NR, 3rd Generation Partnership Project (3GPP), Mobile Competence Centre, 650, Route Des Lucioles, F-06921, Sophia-Antipolis Cedex, France, vol. RAN WG1, No. Spokane, USA, Nov. 12, 2018-Nov. 16, 2018, Nov. 11, 2018 (Nov. 11, 2018), XP051554246, 11 pages.

Xiaomi Communications: "Discussion on PDCCH-WUS Works with Dual DRX," 3GPP Draft, 3GPP TSG-RAN WG2 #109bis-e, R2-2003103, 3rd Generation Partnership Project (3GPP), Mobile Competence Centre, 650, Route Des Lucioles, F-06921, Sophia-Antipolis Cedex, France, vol. RAN WG2. No. Electronic Meeting, Apr. 20, 2020-Apr. 30, 2020, Apr. 10, 2020 (Apr. 10, 2020), XP051871178, 4 pages.

Ericsson: "Procedure for Cross-Slot Scheduling Technique", 3GPP TSG-RAN WG1 Meeting #97, Tdoc R1-1907323, Reno, USA, May 13, 2019-May 17, 2019, May 4, 2019, pp. 1-6, Section 2.

Mediatek Inc: "Design of PDCCH-Based Power Saving Signal/Channel for NR", 3GPP TSG RAN WG1 Meeting #96-Bis, R1-1904487, Xi'an, China, Apr. 8, 2019-Apr. 12, 2019, Apr. 3, 2019, 11 pages, Section 2.

* cited by examiner

| 5QI Value | PDB | PER | Default MDBV | Example Services |
|---|---|---|---|---|
| 1 | 100 ms | 10^-2 | N/A | Conversation Voice |
| 2 | 150 ms | 10^-3 | N/A | Conversational Video |
| 6, 8, 9 | 300 ms | 10^-6 | N/A | Video; TCP-based |
| ... | ... | ... | ... | ... |
| 80 | 10 ms | 10^-6 | N/A | Low Latency eMBB applications; Augment Reality |
| 81 | 5 ms | 10^-5 | 160 B | Remote Control |
| ... | ... | ... | ... | ... |

FIG. 5

|  | VR Split Rendering | AR Split Computation | Cloud Gaming |
|---|---|---|---|
| HMD/Device | Head-mounted with 5G modem attached | Head-mounted with USB/Bluetooth connection to "Puck" or smartphone with 5G modem | 5G Smartphone or Tablet |
| 5G Usage | QoS | QoS | OTT/QoS |
| Location | Enterprise-Indoor, Residential-Indoor Outdoor | Enterprise-Indoor, Outdoor | Outdoor |
| Mobility | Limited to head movements and restricted body movements, Hi-speed (VR in the back of a car) | Pedestrian, Hi-Speed | Static, Hi-speed |

FIG. 6

SCHEDULING AND BANDWIDTH PART ADAPTATION TECHNIQUES FOR EXTENDED REALITY

CROSS-REFERENCE TO RELATED APPLICATION

This present application is a divisional of U.S. patent application Ser. No. 17/228,036, filed on Apr. 12, 2021, which claims priority to and the benefit of U.S. Provisional Application No. 63/009,411, filed on Apr. 13, 2020, which are expressly incorporated by reference in their entireties as if fully set forth below and for all applicable purposes.

BACKGROUND

Field of the Disclosure

Aspects of the present disclosure relate to wireless communications, and more particularly, to techniques for scheduling and bandwidth part (BWP) adaptation for extended reality (XR).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd generation partnership project (3GPP) long term evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more BSs may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink (DL) channels (e.g., for transmissions from a BS or a DU to a UE) and uplink (UL) channels (e.g., for transmissions from a UE to a BS or a DU).

These multiple access technologies have been adopted in various telecommunication standards to provide a common protocol that enables different wireless devices to communicate on a municipal, national, regional, and even global level. New radio (e.g., $5^{th}$ generation (5G) NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the DL and on the UL. To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include power saving by devices using wireless communications to perform extended reality (XR) functions.

Certain aspects provide a method for wireless communication performed by a user equipment (UE). The method generally includes obtaining an indication to change at least one of a minimum control-channel-to-data-channel delay or a bandwidth for receiving a first transmission on a bandwidth part (BWP); changing the at least one of the minimum control-channel-to-data-channel delay to a new minimum control-channel-to-data-channel delay or the bandwidth on the BWP to a new bandwidth; and receiving the first transmission on the BWP using the at least one of the new minimum control-channel-to-data-channel delay or the new bandwidth of the BWP.

Certain aspects provide a method for wireless communication performed by a network entity. The method generally includes obtaining an indication to change at least one of a minimum control-channel-to-data-channel delay or a bandwidth for transmitting a first transmission on a BWP to a UE; changing the at least one of the minimum control-channel-to-data-channel delay to a new minimum control-channel-to-data-channel delay or the bandwidth on the BWP to a new bandwidth for the first transmission to the UE; and transmitting the first transmission on the BWP using the at least one of the new minimum control-channel-to-data-channel delay or the new bandwidth of the BWP.

Certain aspects provide an apparatus for wireless communications. The apparatus generally includes a processor configured to: obtain an indication to change at least one of a minimum control-channel-to-data-channel delay or a bandwidth for receiving a first transmission on a BWP; change the at least one of the minimum control-channel-to-data-channel delay to a new minimum control-channel-to-data-channel delay or the bandwidth on the BWP to a new bandwidth; and receive the first transmission on the BWP using the at least one of the new minimum control-channel-to-data-channel delay or the new bandwidth of the BWP; and a memory coupled with the processor.

Certain aspects provide an apparatus for wireless communications. The apparatus generally includes a processor configured to: obtain an indication to change at least one of a minimum control-channel-to-data-channel delay or a bandwidth for transmitting a first transmission on a BWP to a UE; change the at least one of the minimum control-channel-to-data-channel delay to a new minimum control-channel-to-data-channel delay or the bandwidth on the BWP to a new bandwidth for the first transmission to the UE; and transmit the first transmission on the BWP using the at least one of the new minimum control-channel-to-data-channel delay or the new bandwidth of the BWP; and a memory coupled with the processor.

Certain aspects provide an apparatus for wireless communications. The apparatus generally includes means for obtaining an indication to change at least one of a minimum control-channel-to-data-channel delay or a bandwidth for receiving a first transmission on a BWP; means for changing the at least one of the minimum control-channel-to-data-channel delay to a new minimum control-channel-to-data-channel delay or the bandwidth on the BWP to a new bandwidth; and means for receiving the first transmission on the BWP using the at least one of the new minimum control-channel-to-data-channel delay or the new bandwidth of the BWP.

Certain aspects provide an apparatus for wireless communications. The apparatus generally includes means for obtaining an indication to change at least one of a minimum control-channel-to-data-channel delay or a bandwidth for transmitting a first transmission on a BWP to a UE; means for changing the at least one of the minimum control-channel-to-data-channel delay to a new minimum control-channel-to-data-channel delay or the bandwidth on the BWP to a new bandwidth for the first transmission to the UE; and means for transmitting the first transmission on the BWP using the at least one of the new minimum control-channel-to-data-channel delay or the new bandwidth of the BWP.

Certain aspects provide a computer-readable medium for wireless communications. The computer-readable medium includes instructions that, when executed by a processing system, cause the processing system to perform operations generally including obtaining an indication to change at least one of a minimum control-channel-to-data-channel delay or a bandwidth for receiving a first transmission on a BWP; changing the at least one of the minimum control-channel-to-data-channel delay to a new minimum control-channel-to-data-channel delay or the bandwidth on the BWP to a new bandwidth; and receiving the first transmission on the BWP using the at least one of the new minimum control-channel-to-data-channel delay or the new bandwidth of the BWP.

Certain aspects provide a computer-readable medium for wireless communications. The computer-readable medium includes instructions that, when executed by a processing system, cause the processing system to perform operations generally including obtaining an indication to change at least one of a minimum control-channel-to-data-channel delay or a bandwidth for transmitting a first transmission on a BWP to a UE; changing the at least one of the minimum control-channel-to-data-channel delay to a new minimum control-channel-to-data-channel delay or the bandwidth on the BWP to a new bandwidth for the first transmission to the UE; and transmitting the first transmission on the BWP using the at least one of the new minimum control-channel-to-data-channel delay or the new bandwidth of the BWP.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 5 is a table illustrating various fifth generation (5G) quality indicators, in accordance with certain aspects of the present disclosure.

FIG. 6 is a table illustrating various use cases for extended reality (XR), in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
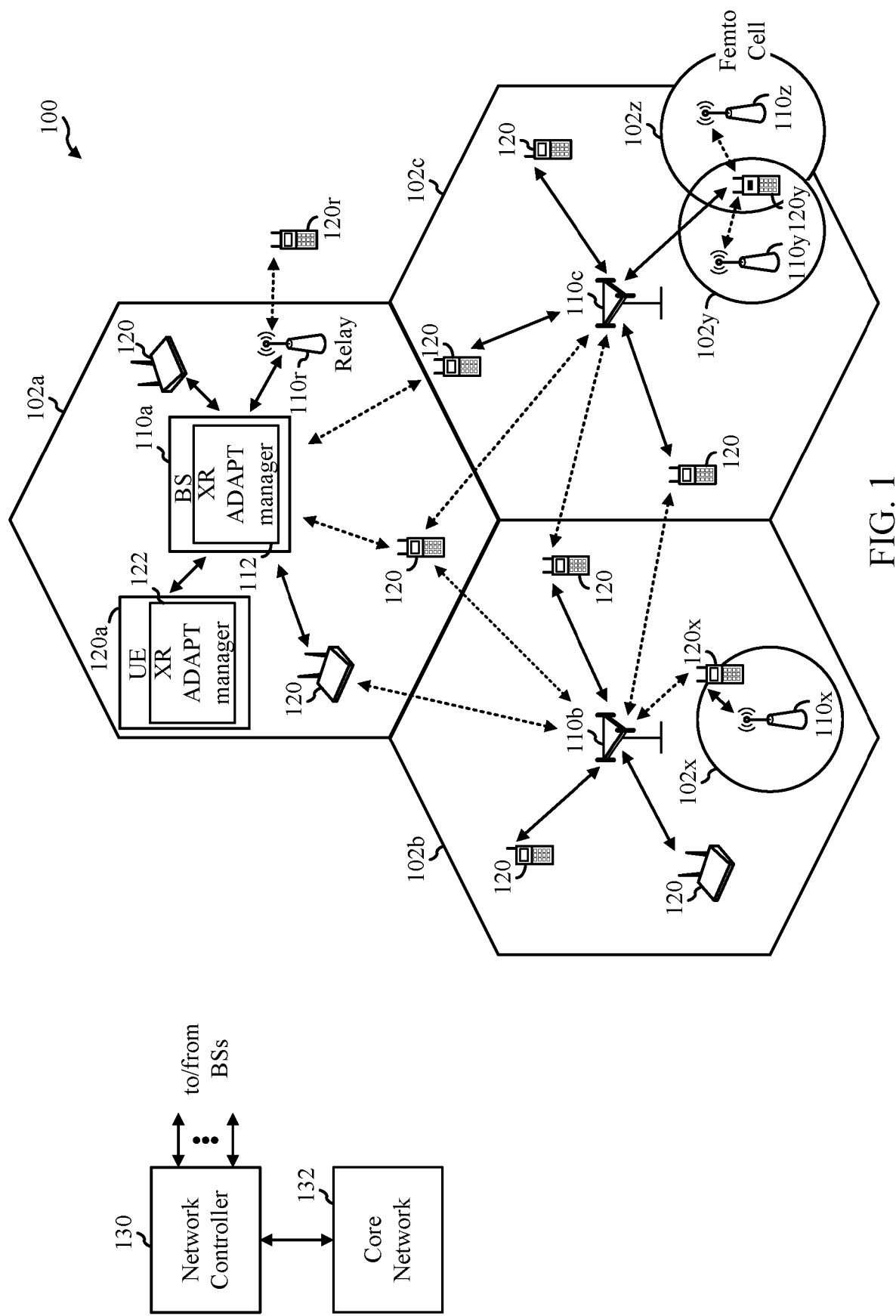
FIG. 1 is a block diagram conceptually illustrating an example telecommunications system, in accordance with certain aspects of the present disclosure.

Aspects of the present disclosure provide apparatus, methods, processing systems, and computer readable mediums for scheduling and bandwidth part (BWP) adaptation for extended reality (XR). In aspects of the present disclosure, XR techniques allow the interaction between activities in virtual and real environments. XR includes augmented reality (AR), mixed reality (MR) and virtual reality (VR). An XR device is a mobile device (e.g., a smart glass, a watch, or a cellphone), which may support wireless data exchange with a server. XR applications may support a dynamic reconstruction of 3D environment and/or fusion of real and virtual environments. The XR applications may require high quality video data and very low latency. Since the XR device may be wearable and mobile, it is desirable that the XR device may have a good battery life (e.g., one day) and avoid overheating, so users will have a good experience.

The following description provides examples of techniques for improving downlink (DL) wireless data transfer for XR applications to improve power efficiency of those DL wireless data transfers and the XR applications in wireless communication systems. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. Multiple input multiple output (MIMO) transmissions with precoding may also be supported. MIMO configurations in a downlink (DL) may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

Example Wireless Communications System

FIG. 1 illustrates an example wireless communication network 100 in which aspects of the present disclosure may be performed. For example, the wireless communication network 100 may include one or more base stations (BSs) 110 and/or one or more user equipments (UEs) 120 configured to execute techniques for scheduling and bandwidth part (BWP) adaptation for extended reality (XR). As shown in FIG. 1, a UE 120a includes a XR ADAPT manager 122 that may be configured to perform operations 900 of FIG. 9. A BS 110a includes a XR ADAPT manager 112 that may be configured to perform operations 1000 of FIG. 10.

The wireless communication network 100 may be a new radio (NR) system (e.g., a 5$^{th}$ generation (5G) NR network). As shown in FIG. 1, the wireless communication network 100 may be in communication with a core network (CN) 132. The CN 132 may in communication with one or more BSs 110a-z (each also individually referred to herein as a BS 110 or collectively as BSs 110) and/or UEs 120a-y (each also individually referred to herein as a UE 120 or collectively as UEs 120) in the wireless communication network 100 via one or more interfaces.

The BS 110 may provide communication coverage for a particular geographic area, sometimes referred to as a "cell", which may be stationary or may move according to the location of a mobile BS 110. In some examples, multiple BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. The BS 110 may support one or multiple cells.

The BSs 110 communicate with the UEs 120 in the wireless communication network 100. The UEs 120 (e.g., 120x, 120y, etc.) may be dispersed throughout the wireless communication network 100, and each UE 120 may be stationary or mobile. The wireless communication network 100 may also include relay stations (e.g., a relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between the UEs 120, to facilitate communication between wireless devices.

A network controller 130 may be in communication with a set of BSs 110 and provide coordination and control for these BSs 110 (e.g., via a backhaul). In aspects, the network controller 130 may be in communication with the CN 132 (e.g., a 5G core network (5GC)), which provides various network functions such as access and mobility management, session management, user plane function, policy control function, authentication server function, unified data management, application function, network exposure function, network repository function, network slice selection function, etc.

A radio access network (RAN) may include the network controller 160 and the BS 110. The RAN may be in communication with the CN 132 and an application server (AS). According to certain aspects, the BSs 110 and the UEs 120 may be configured for one or more services involving traffic flows between the application provider (e.g., the AS) and/or the BSs 110 and the UEs 120 associated with one or more applications running on the UEs 120. For example, the UE 120a may be requesting admission (e.g., requesting the BS 110a to serve as a link between the UE 120a and the AS) for the one or more traffic flows for a service related to an application.

The wireless communication network 100 may also include relay stations. A relay station is a station that receives a transmission of data and/or other information from an upstream station (e.g., a BS 110 or a UE 120) and sends a transmission of the data and/or other information to a downstream station (e.g., a UE 120 or a BS 110). A relay station may also be a UE 120 that relays transmissions for other UEs 120. In the example shown in FIG. 1, a relay station 110r may communicate with a BS 110a and a UE 120r in order to facilitate communication between the BS 110a and the UE 120r. A relay station may also be referred to as a relay BS, a relay, etc.

The wireless communication network 100 may be a heterogeneous network that includes BSs 110 of different types, e.g., macro BS, pico BS, femto BS, relays, etc. These different types of BSs 110 may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

The wireless communication network 100 may support synchronous or asynchronous operation. For synchronous operation, BSs 110 may have similar frame timing, and transmissions from different BSs 110 may be approximately aligned in time. For asynchronous operation, the BSs 110 may have different frame timing, and transmissions from different BSs 110 may not be aligned in time. The techniques described herein may be used for both synchronous and asynchronous operation.

In FIG. 1, a solid line with double arrows indicates desired transmissions between a UE 120 and a serving BS 110, which is the BS 110 designated to serve the UE 120 on a downlink (DL) and/or an uplink (UL). A finely dashed line with double arrows indicates potentially interfering transmissions between the UE 120 and the BS 110.

Figure 2:
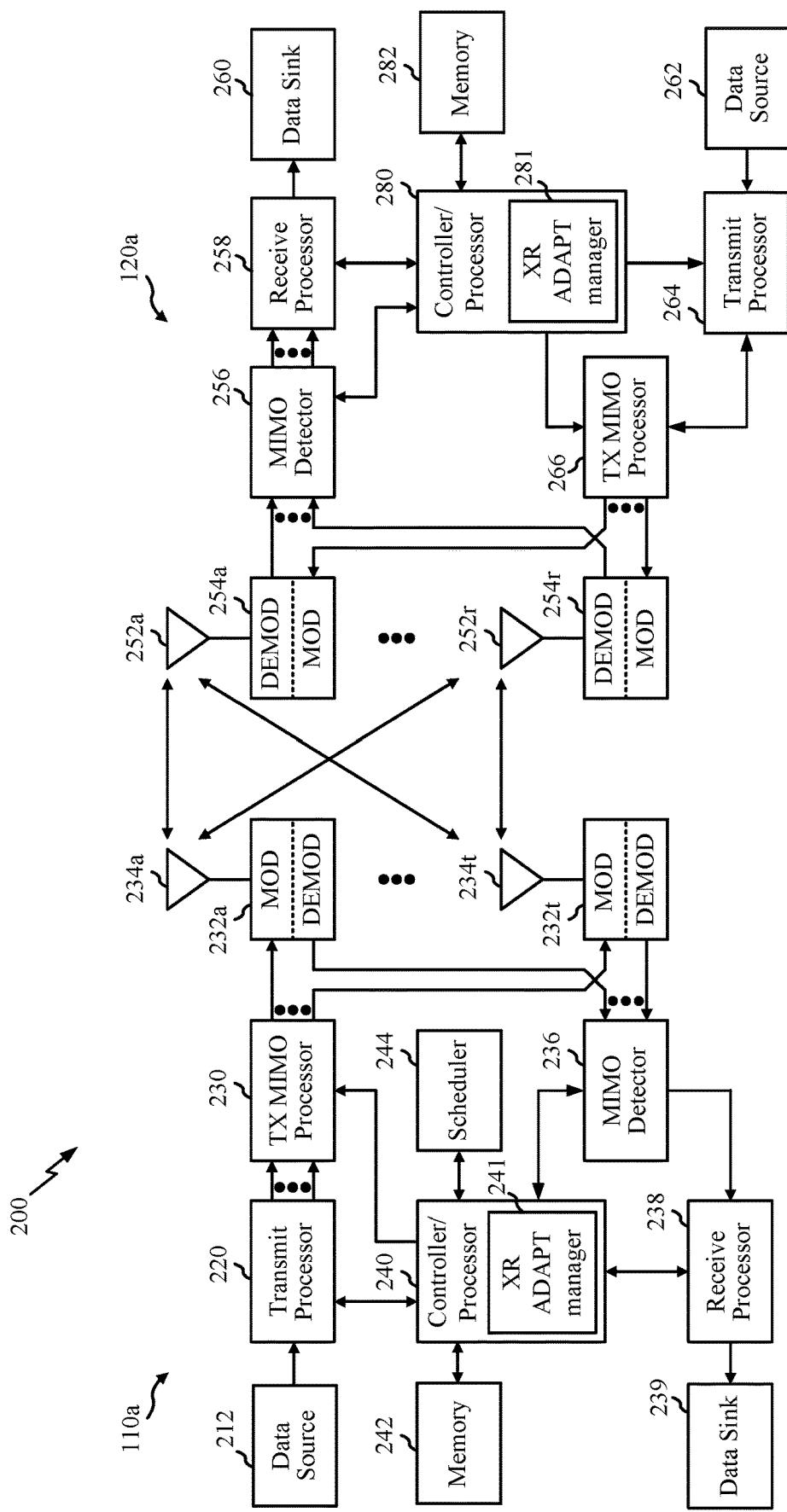
FIG. 2 is a block diagram conceptually illustrating a design of an example a base station (BS) and user equipment (UE), in accordance with certain aspects of the present disclosure.

FIG. 2 illustrates example components of a BS 110a and a UE 120a (e.g., in the wireless communication network 100 of FIG. 1).

At the BS 110a, a transmit processor 220 may receive data from a data source 212 and control information from a controller/processor 240. The control information may be for a physical broadcast channel (PBCH), a physical control format indicator channel (PCFICH), a physical hybrid ARQ (automatic repeat request) indicator channel (PHICH), a physical downlink control channel (PDCCH), a group common PDCCH (GC PDCCH), etc. The data may be for a physical downlink shared channel (PDSCH), etc. A medium access control—control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The transmit processor 220 may process (e.g., encode and symbol map) the data and control information to obtain data symbols and control symbols, respectively. The transmit processor 220 may also generate reference symbols, such as for a primary synchronization signal (PSS), a secondary synchronization signal (SSS), and a channel state information reference signal (CSI-RS). A transmit multiple-input multiple-output (MIMO) processor 230 may perform spatial processing (e.g., precoding) on the data symbols, the control symbols, and/or the reference symbols, if applicable, and may provide output symbol streams to modulators (MODs) in transceivers 232a-232t. Each MOD in transceivers 232a-232t may process a respective output symbol stream (e.g., for orthogonal frequency division multiplexing (OFDM), etc.) to obtain an output sample stream. Each MOD in transceivers 232a-232t may further process (e.g., convert to analog, amplify, filter, and up convert) the output sample stream to obtain a DL signal. The DL signals from the MODs in transceivers 232a-232t may be transmitted via antennas 234a-234t, respectively.

At the UE 120a, antennas 252a-252r may receive DL signals from the BS 110a and may provide received signals to demodulators (DEMODs) in transceivers 254a-254r, respectively. Each DEMOD in the transceiver 254 may condition (e.g., filter, amplify, down convert, and digitize) a respective received signal to obtain input samples. Each DEMOD in the transceiver 254 may further process the input samples (e.g., for OFDM, etc.) to obtain received symbols. A MIMO detector 256 may obtain received symbols from all the DEMODs in the transceivers 254a-254r, perform MIMO detection on the received symbols if applicable, and provide detected symbols. A receive processor 258 may process (e.g., demodulate, deinterleave, and decode) the detected symbols, provide decoded data for the UE 120*a* to a data sink 260, and provide decoded control information to a controller/processor 280.

On an UL, at the UE 120*a*, a transmit processor 264 may receive and process data (e.g., for a PUSCH) from a data source 262 and control information (e.g., for a physical uplink control channel (PUCCH) from the controller/processor 280. The transmit processor 264 may also generate reference symbols for a reference signal (e.g., for a sounding reference signal (SRS)). The symbols from the transmit processor 264 may be precoded by a transmit MIMO processor 266 if applicable, further processed by the MODs in transceivers 254*a*-254*r* (e.g., for SC-FDM, etc.), and transmitted to the BS 110*a*. At the BS 110*a*, the UL signals from the UE 120*a* may be received by the antennas 234, processed by the DEMODs in transceivers 232, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

Memories 242 and 282 may store data and program codes for the BS 110*a* and the UE 120*a*, respectively. A scheduler 244 may schedule the UE 120*a* for data transmission on a DL and/or an UL.

Antennas 252, processors 266, 258, 264, and/or controller/processor 280 of the UE 120*a* and/or antennas 234, processors 220, 230, 238, and/or controller/processor 240 of the BS 110*a* may be used to perform the various techniques and methods described herein. For example, as shown in FIG. 2, the controller/processor 240 of the BS 110*a* has a XR ADAPT manager 241 that may be configured to perform the operations illustrated in FIG. 10, as well as other operations disclosed herein. As shown in FIG. 2, the controller/processor 280 of the UE 120*a* has a XR ADAPT manager 281 that may be configured to perform the operations illustrated in FIG. 9, as well as other operations disclosed herein. Although shown at the controller/processor, other components of the UE 120*a* and the BS 110*a* may be used to perform the operations described herein.

NR may utilize OFDM with a cyclic prefix (CP) on the UL and the DL. The NR may support half-duplex operation using time division duplexing (TDD). The OFDM and single-carrier frequency division multiplexing (SC-FDM) partition system bandwidth into multiple orthogonal subcarriers, which are also commonly referred to as tones, bins, etc. Each subcarrier may be modulated with data. Modulation symbols may be sent in a frequency domain with the OFDM and in a time domain with the SC-FDM. The spacing between adjacent subcarriers may be fixed, and a total number of subcarriers may be dependent on the system bandwidth. The minimum resource allocation, called a resource block (RB), may be 12 consecutive subcarriers. The system bandwidth may also be partitioned into sub-bands. For example, a subband may cover multiple RBs. The NR may support a base subcarrier spacing (SCS) of 15 KHz and other SCS may be defined with respect to the base SCS (e.g., 30 kHz, 60 kHz, 120 kHz, 240 kHz, etc.).

Figure 3:
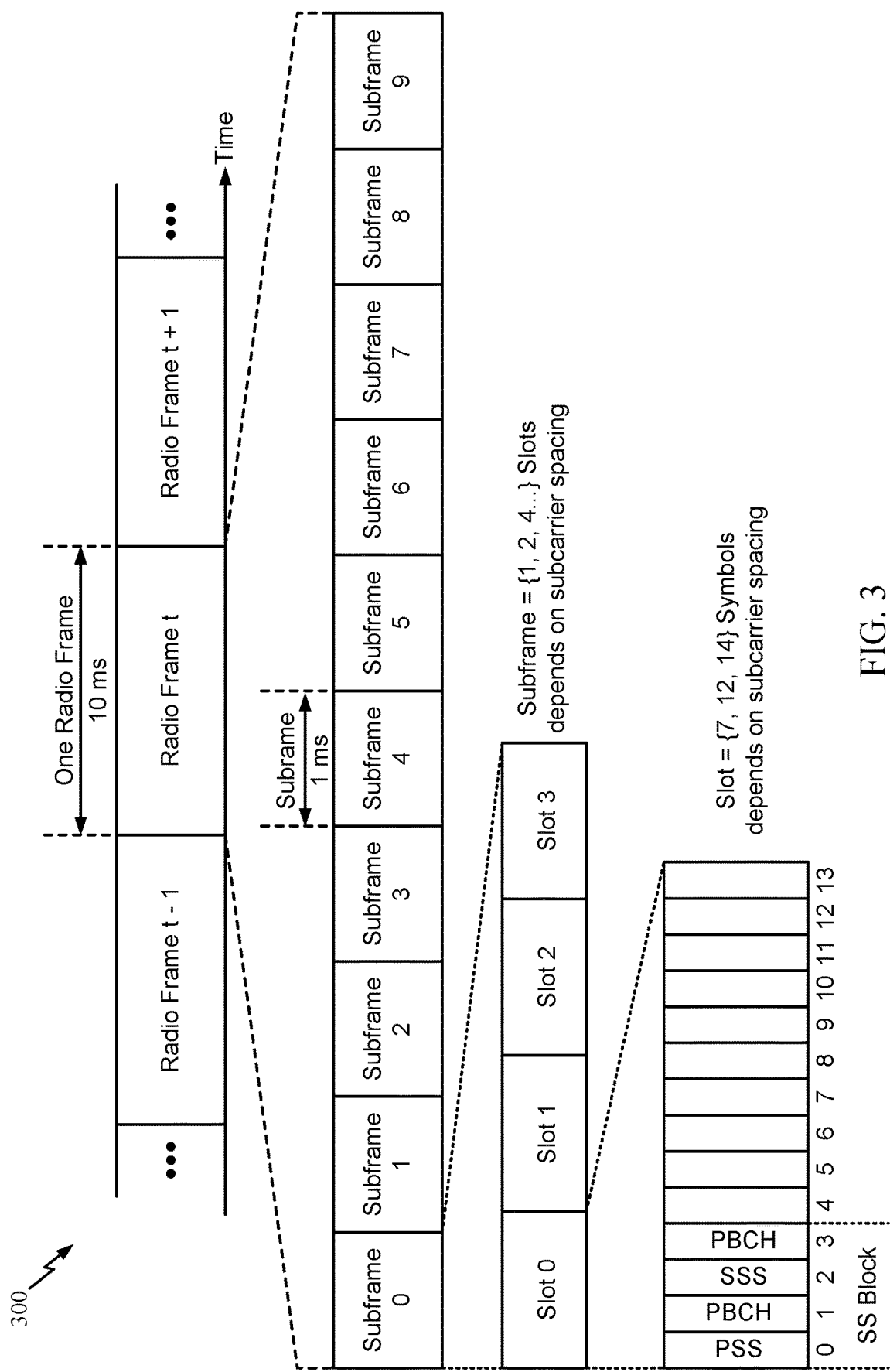
FIG. 3 is an example frame format for certain wireless communication systems (e.g., new radio (NR)), in accordance with certain aspects of the present disclosure.

FIG. 3 is a diagram showing an example of a frame format 300 for NR. A transmission timeline for each of DL and UL may be partitioned into units of radio frames. Each radio frame may have a predetermined duration (e.g., 10 ms), and may be partitioned into 10 subframes, each of 1 ms, with indices of 0 through 9. Each subframe may include a variable number of slots (e.g., 1, 2, 4, 8, 16, . . . slots) depending on a SCS. Each slot may include a variable number of symbol periods (e.g., 7, 12, or 14 symbols) depending on the SCS. Symbol periods in each slot may be assigned indices. A sub-slot structure may refer to a transmit time interval having a duration less than a slot (e.g., 2, 3, or 4 symbols). Each symbol in a slot may be configured for a link direction (e.g., a DL, an UL, or a flexible) for data transmission, and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and the SSS may be used by UEs for cell search and acquisition. The PSS may provide half-frame timing, a synchronization signal (SS) may provide a CP length and frame timing. The PSS and the SSS may provide cell identity. The PBCH carries some basic system information, such as DL system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a PDSCH in certain subframes. The SSB can be transmitted up to sixty-four times, for example, with up to sixty-four different beam directions for mmWave. The multiple transmissions of the SSB are referred to as a SS burst set. The SSBs in an SS burst set may be transmitted in the same frequency region, while the SSBs in different SS bursts sets can be transmitted at different frequency regions.

Figure 4:
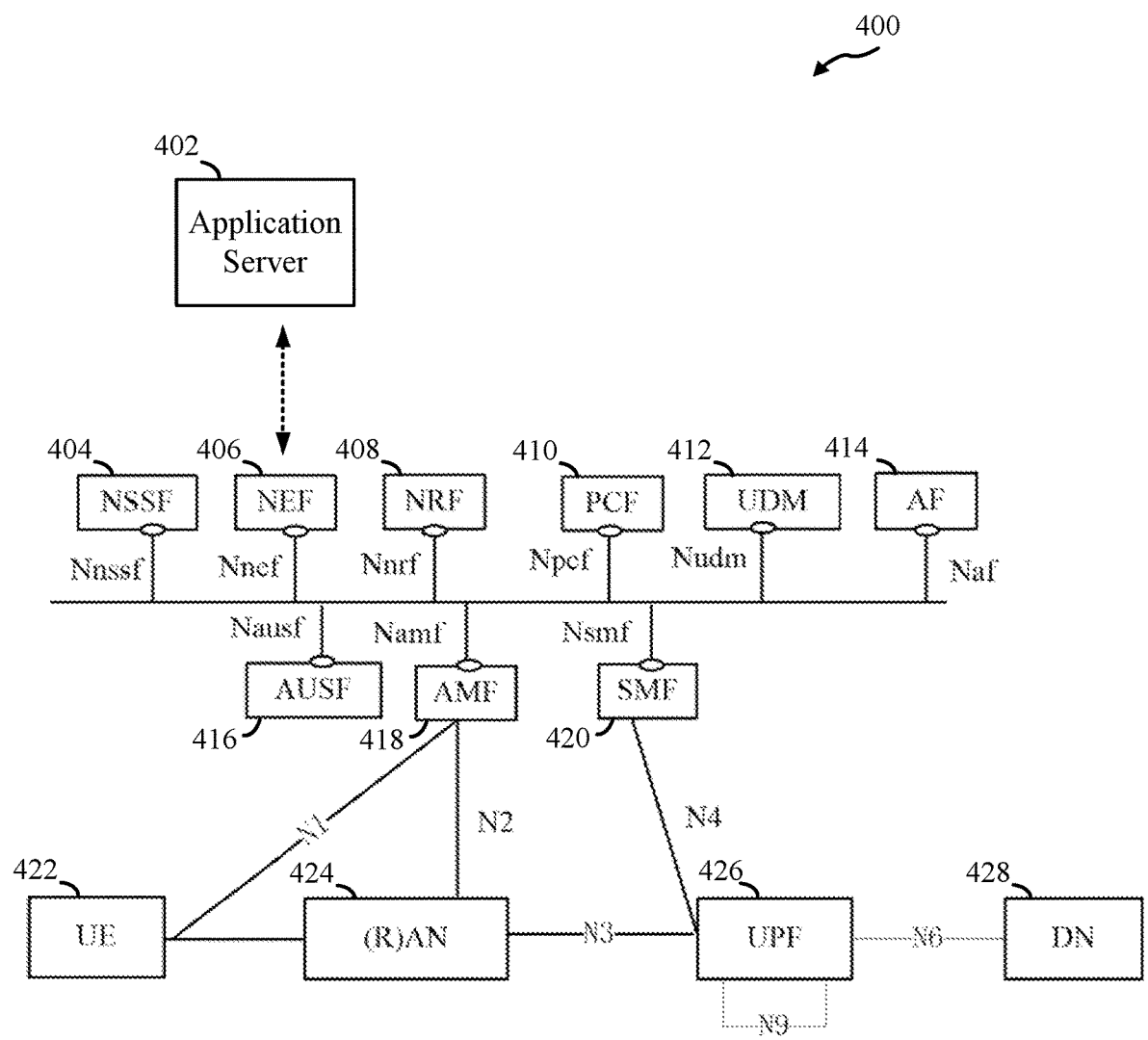
FIG. 4 is a block diagram illustrating an example architecture of a core network (CN) in communication with a radio access network (RAN), in accordance with certain aspects of the present disclosure.

FIG. 4 is a block diagram illustrating an example architecture of a CN 400 (e.g., such as the CN 132 in FIG. 1) in communication with a RAN 424 and an AS 402, in accordance with certain aspects of the present disclosure. As shown in FIG. 4, the example architecture includes the CN 400, the RAN 424, a UE 422, and a data network (DN) 428 (e.g. operator services, Internet access or third party services).

The CN 400 may host core network functions. The CN 400 may be centrally deployed. The CN 400 functionality may be offloaded (e.g., to advanced wireless services (AWS)), in an effort to handle peak capacity. As shown in FIG. 4, the CN 400 may be implemented by one or more network entities that perform network functions (NF) including Network Slice Selection Function (NSSF) 404, Network Exposure Function (NEF) 406, NF Repository Function (NRF) 408, Policy Control Function (PCF) 410, Unified Data Management (UDM) 412, Application Function (AF) 414, Authentication Server Function (AUSF) 416, Access and Mobility Management Function (AMF) 418, Session Management Function (SMF) 420; User Plane Function (UPF) 426, and various other functions (not shown) such as Unstructured Data Storage Function (UDSF); Unified Data Repository (UDR); 5G-Equipment Identity Register (5G-EIR); and/or Security Edge Protection Proxy (SEPP).

The AMF 418 may include the following functionality (some or all of the AMF 418 functionalities may be supported in one or more instances of the AMF 418): termination of RAN control plane (CP) interface (N2); termination of non-access stratum (NAS) (e.g., N1), NAS ciphering and integrity protection; registration management; connection management; reachability management; mobility management; lawful intercept (for AMF events and interface to L1 system); transport for session management (SM) messages between the UE 422 and the SMF 420; transparent proxy for routing SM messages; access authentication; access authorization; transport for short message service (SMS) messages between the UE 422 and a SMS function (SMSF); Security Anchor Functionality (SEAF); Security Context Management (SCM), which receives a key from the SEAF that it uses to derive access-network specific keys; Location Services management for regulatory services; transport for Location Services messages between the UE 422 and a location management function (LMF) as well as between the RAN 424 and LMF; evolved packet service (EPS) bearer ID allocation for interworking with EPS; and/or UE mobility event notification; and/or other functionality.

The SMF 420 may support: session management (e.g., session establishment, modification, and release), UE IP address allocation and management, dynamic host configuration protocol (DHCP) functions, termination of NAS signaling related to session management, downlink data notification, and traffic steering configuration for UPF for proper traffic routing. The UPF 426 may support: packet routing and forwarding, packet inspection, quality-of-service (QoS) handling, external protocol data unit (PDU) session point of interconnect to DN 228, and anchor point for intra-RAT and inter-RAT mobility. The PCF 410 may support: unified policy framework, providing policy rules to control protocol functions, and/or access subscription information for policy decisions in UDR. The AUSF 416 may acts as an authentication server. The UDM 412 may support: generation of Authentication and Key Agreement (AKA) credentials, user identification handling, access authorization, and subscription management. The NRF 408 may support: service discovery function, and maintain NF profile and available NF instances. NSSF may support: selecting of the Network Slice instances to serve the UE 422, determining the allowed network slice selection assistance information (NSSAI), and/or determining the AMF set to be used to serve the UE 422.

The NEF 406 may support: exposure of capabilities and events, secure provision of information from external application to 3GPP network, translation of internal/external information. The AF 414 may support: application influence on traffic routing, accessing The NEF 406, and/or interaction with policy framework for policy control.

As shown in FIG. 4, the CN 400 may be in communication with the AS 402, the UE 422, the RAN 424, and the DN 428. In some examples, the CN 200 communicates with the AS 402 via the NEF 406 and/or the AF 414.

Example Services and QoS Parameters

A communication system such as a wireless communication network (e.g., such as the wireless communication network 100 or the RAN 424) may provide communication services to a user equipment (UE) (e.g., the UE 120 or the UE 422). For example, $5^{th}$ generation (5G) new radio (NR) may support services such as enhanced mobile broadband (eMBB) service targeting wide bandwidth (e.g., 80 MHz or beyond), ultra-reliable low-latency communication (URLLC) service, and others services including extended reality (XR) services discussed in more detail below. The services may include latency and reliability requirements. The services may have different transmission time intervals (TTI) to meet respective quality of service (QoS) requirements.

Traffic requirements for a service may be summarized via a set of parameters (e.g., QoS parameters) and associated with a traffic flow that supports the service. The parameters may include a packet error rate (PER), a packet delay budget (PDB), and/or a guaranteed bit rate (GBR). The PER may be a ratio, in percent, of successfully received packets. For example, the PER may define an upper bound for a rate of protocol data units (PDUs) (e.g. IP packets) that have been processed by the sender of a link layer protocol (e.g. a radio link control (RLC) in a radio access network (RAN) of a 3rd generation partnership project (3GPP) access) but that are not successfully delivered by the corresponding receiver to the upper layer (e.g. a packet data convergence protocol (PDCP) in RAN of a 3GPP access). Thus, the PER may define an upper bound for a rate of non-congestion related packet losses. PDB may be defined as an upper bound for the time that a packet may be delayed between the UE (e.g., UE 422) and the UPF (e.g., UPF 426) on a core network (CN) side. The GBR may indicate the bandwidth (bit rate) to be guaranteed by the network.

A resource type may determine if dedicated network resources related to a QoS flow-level guaranteed flow bit rate (GFBR) value are permanently allocated (e.g., by an admission control function in a radio base station (BS)), while a non-GBR QoS flow may be pre-authorized through static policy and charging control. A GBR QoS flow may use either the GBR resource type or the Delay-critical GBR resource type. For traffic flows of type "Delay critical GBR" (e.g., for URLLC traffic flows), a parameter called Maximum Data Burst Volume (MDBV) is specified to describe the traffic burst. The MDBV denotes the largest amount of data that the 5G-AN is required to serve within a period of 5G-AN PDB (e.g., 5G-AN part of the PDB). The MDBV may be signaled together with a standardized indicator value (e.g., 5QI to the RAN (e.g., the RAN 424 of FIG. 4), and if it is received, it shall be used instead of the default value.

The Table 500 in FIG. 5 shows example QoS parameters that may be configured for various services. In some examples, a conversational voice service, a conversational video service (e.g., such as live streaming), and a video service (e.g., such as buffered streaming) and/or TCP-based service (e.g., such as the World Wide Web, email, chat, ftp, p2p file sharing, progressive video, etc.) may be associated with eMBB service. In some examples, a remote control service (e.g., a UE being operated remotely, either by a human or a computer, such as a remote driver or a vehicle to everything (V2X) application to operate a remote vehicle with no driver or a remote vehicle located in a dangerous environment) may be associated with URLCC. In some examples, low-latency eMBB applications may be associated with XR service. The XR service may refer to services such augmented reality (AR), virtual reality (VR), and cloud gaming The AR and VR services may be characterized by a human being interacting with the environment or people, or controlling the UE, and relying on audio-visual feedback. In the use cases like the VR and interactive conversation the latency requirements include the latencies at the application layer (e.g., codecs), which could be specified outside of 3GPP.

The QoS parameters and services shown in the Table 500 in FIG. 5 are merely illustrative, and various other QoS parameters and services may be specified.

At high PDB values (e.g., equal to or exceeding 100 ms), the burst of a traffic over the PDB range may be closely approximated by the GBR*PDB. For some traffic flows, measured over every PDB, the percentile of times when the burst exceeds GBR*PDB is small relative to the PER.

Dropping packets of such bursts will have negligible effect on the PER of the traffic. Thus, for such traffic flows it may not be important to convey the size of the traffic burst. However, for traffic flows at low PDB and low PER values, the volume of traffic that the 5G system handles can be much higher than GBR*PDB. In this case, it is useful to describe the traffic burst.

As mentioned above, the MDBV is specified for the traffic flows of type "Delay critical GBR" which are expected to handle traffic of low throughput. Thus, in some cases the range of values for the MDBV is capped at 4095 Bytes (e.g., when signaled on 5G network interfaces). Even with a PDB of 1 ms, the throughout cap of 4095 Bytes implies that the maximum throughput on that flow can be no more than 4095 Bytes/ms (i.e., around 32.76 Mbps). The supported throughput may be even lower on traffic flows with larger PDB values. However, for certain services, such as XR services (e.g., AR, VR, cloud gaming), the throughput requirements (e.g., up to 250 Mbps) and PDB requirements (e.g., 25 ms) can be higher.

Example Extended Reality

New Radio (NR) is an emerging wireless communications technology under development in conjunction with the 5G Technology Forum (SGTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). The wireless communication services may include a latency (e.g., a file delay budget (FDB) and/or a packet delay budget (PDB)) and reliability requirements (e.g., a file error rate (FER) and/or a packet error rate (PER)), and may also have different transmission time intervals (TTI) to meet respective quality of service (QoS) requirements. Extended reality (XR) is wireless communication service for services requiring low latency (e.g., a PDB of between 5 ms and 25 ms) and high bit-rate (e.g., a PER of less than or equal to 1e-3).

FIG. 6 shows a table 600 illustrating various use cases for XR. For example, virtual reality (VR) may be used for cloud gaming, VR split rendering, and augmented reality (AR) split computations. Cloud gaming generally refers to gaming on a user device where at least some of a graphical processor unit (GPU) processing is performed on a cloud server where more powerful GPUs may be implemented. Similarly, GPU processing for the VR and the AR may be split between the GPU on the cloud and the GPU on the user device. However, cloud gaming, split rendering, and split computation services require low latency to maintain an acceptable gaming experience. As illustrated, the cloud gaming may be implemented using QoS or over a top (OTT) on a 5G network. Moreover, different use cases may have different location and mobility requirements.

According to aspects of the present disclosure, power consumption by AR devices may be a challenge to their usefulness. To be a useful augmentation to smartphones, it is desirable for battery life of the AR devices (e.g., an AR glass such as an AR glass 726 shown in FIG. 7) to match the expectation for smartphone battery life (i.e. one full day of use between charges). However, a design constraint for the AR glass is that battery capacity is severely limited, because the proximity of the AR glass to the user's forehead makes preventing high temperatures (i.e., of the battery) desirable.

In aspects of the present disclosure, an AR glass physically tethered to a smartphone may be a successful design given the technological constraints. Power requirements may still be challenging for the described form-factor, in part due to a potential 2-watt power budget_for the AR glass, including power for a system on chip (SoC) (e.g., a graphics processing unit (GPU), a central processing unit (CPU), and/or memory), a display, a camera, and/or sensors.

Figure 7:
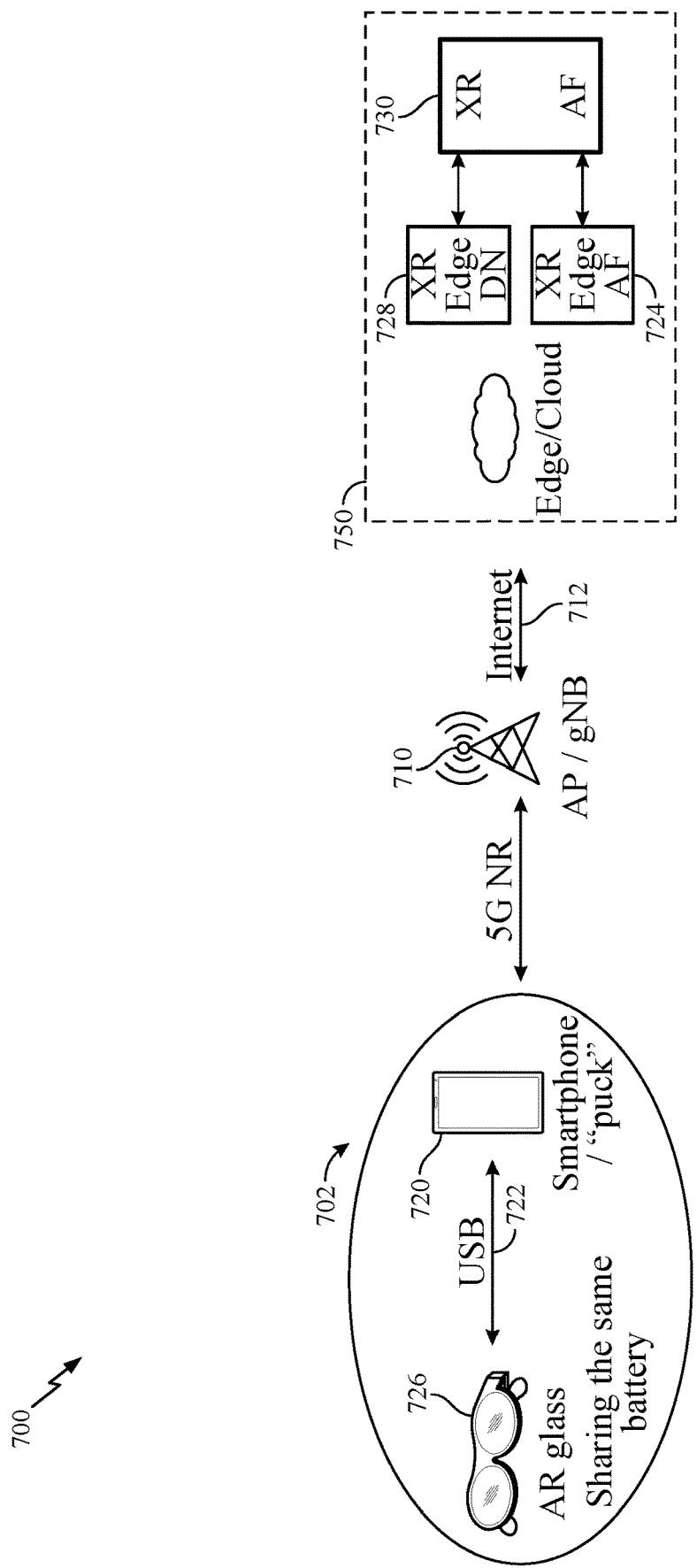
FIG. 7 illustrates a wireless communication system for XR, in accordance with certain aspects of the present disclosure.

FIG. 7 illustrates a wireless communication system 700 (e.g., a 5G system) for XR. As illustrated, the wireless communication system 700 may include a UE 720 (e.g., such as the UE 120 of FIG. 1), a radio access network (RAN) 702 (e.g., such as wireless communication network 100 of FIG. 1) including a BS 710 (e.g., such as the BS 110 of FIG. 1), and Internet 712. In certain aspects, the UE 720 may be associated with or tethered to an AR glass 726 via, for example, a universal serial bus (USB) interface 722, for VR or AR applications. As illustrated, the 5G system 700 may communicate with an edge cloud server 750, which may include logic entities such as an XR edge data network (DN) 728 and an XR edge application function 724. An edge cloud server 750 refers to a cloud server located closer to the UE 720, allowing communication of data with lower latency for various applications as described herein. For example, CN to XR edge server latency may be negligible as compared to the 5G system 700 latency. The edge cloud server 750 may be associated with an XR public cloud AF 730.

According to aspects of the present disclosure, XR downlink (DL) traffic may be H.264 and/or H.265 encoded video. This video may be quasi-periodic, with a burst for every frame and thus a burst rate in bursts per second equal to a frame rate of the video in frames per second (fps). Alternatively, this video may be quasi-periodic, with two possibly staggered "eye-buffers" per frame and thus the burst rate in the bursts per second equal to 2 times the frame rate in fps.

In aspects of the present disclosure, frames can be split into multiple files, with each file may be processed separately.

According to aspects of the present disclosure, files of each frame can be intra-coded (i.e., I frames), predicted (i.e., P frames), or bi-directional predicted (i.e., B frames). The I-frame may include a complete video frame or image, like a JPG or BMP image file. On the contrary, the P-frame may include only changes in an image from a previous frame. For example, only portions of the image that have changed since the previous frame are encoded, whereas unchanging pixels in the frame (e.g., background) are not stored by an encoder, thus saving space. Accordingly, the I frame is larger (e.g., in number of bits) than the P frame. The B-frame saves even more space by using differences between a current frame and both preceding and following frames to specify its content. Accordingly, the B frame may be smaller than the I frame and the P frame.

In aspects of the present disclosure, uplink (UL) transmissions for cloud gaming applications include controller information, while for VR split rendering the UL transmissions may include controller information and user pose information.

According to aspects of the present disclosure, periodicity of UL transmissions can be higher than DL transmissions, to convey latest information from a controller to a server.

In aspects of the present disclosure, AR split computation architectures may include a second flow for AR UL transmissions, for computer vision (e.g., to determine user pose information), on an edge and/or a cloud.

Figure 8:
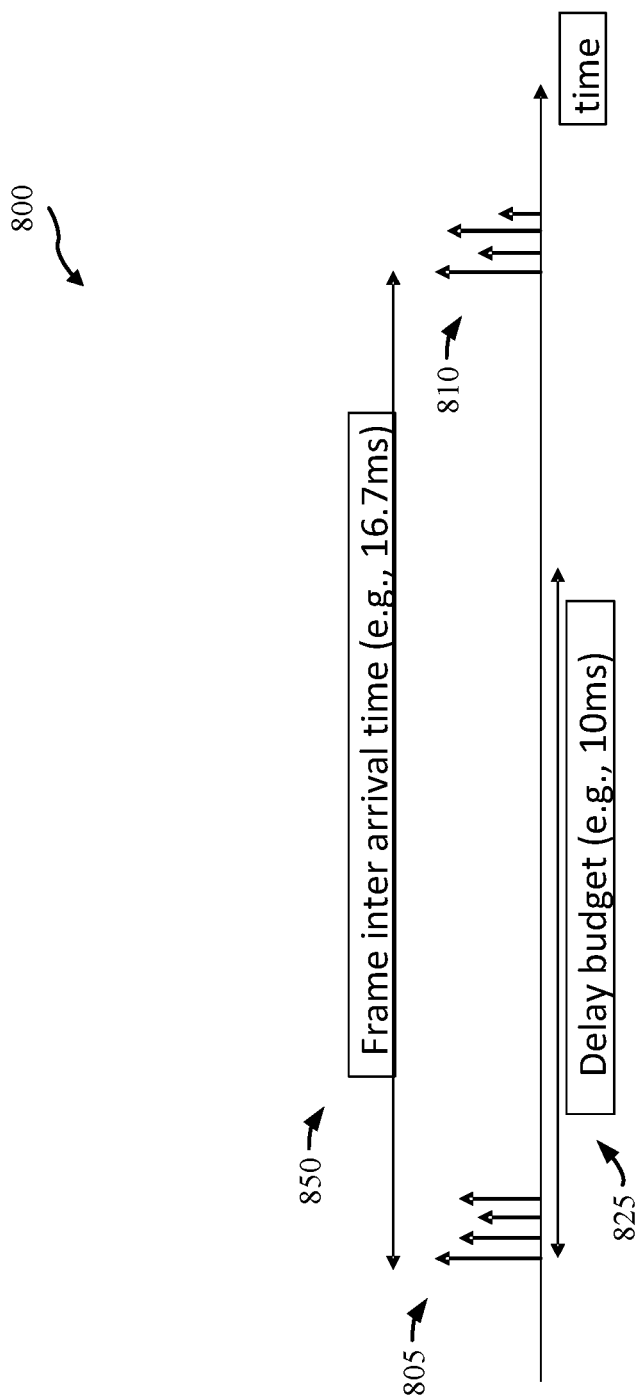
FIG. 8 shows three transmission timelines, in accordance with certain aspects of the present disclosure.

FIG. 8 shows a transmission timeline 800, according to certain aspects of the present disclosure. The transmission timeline 800 shows XR DL traffic. As noted above, the XR DL traffic may show a quasi-periodic pattern because underlying data frames are generated quasi-periodically. The frame rate is typically 120 or 60 Hz, which correspond to inter-frame intervals of 8.3 ms and 16.7 ms (as shown at 850). The transmission timeline 800 illustrates how bursts can vary in size, with a burst for an I frame at 805 and the burst for a P frame at 810.

Connected discontinuous reception (C-DRX) can be configured for power efficient communication. In the C-DRX operation, a UE periodically wakes up (e.g., powers-on a receiver) to receive data. To configure the C-DRX for power-efficient communication of XR frames, it is desirable for a periodicity of the C-DRX to match an inter-frame interval of the XR application. In the described C-DRX operations, the UE goes to sleep (e.g., powers-off the receiver or part of the receiver) once frame data is received. Each frame may consist of several slices that can be transmitted over multiple slots. Together the slices compose a data burst.

In aspects of the present disclosure, a delay requirement (e.g., a 10 ms delay budget as shown at 825) for XR operations is stricter than a file transfer protocol (FTP) download or web browsing delay budget.

According to aspects of the present disclosure, data for a frame should be successfully received within one DRX cycle if C-DRX is configured on a UE.

In Rel-15, K0 (i.e., control-channel-to-data-channel delay for a physical downlink shared channel (PDSCH)) values, which can be indicated in scheduling downlink control information (DCI), can be radio resource control (RRC)-configured in a time domain resource allocation (TDRA) table and a specific K0 value may be indicated in the scheduling DCI. A gNB can ensure that all configured K0 values are non-zero. A UE can then find a minimum of all K0 values and check that a minimum K0 is non-zero, and if so, the UE can execute extended microsleep. In Rel-16, an explicit threshold for a minimum K0 can be configured. The above discussion can also be applied to K2 (i.e., control-channel-to-data-channel delay for a physical uplink shared channel (PUSCH)) in a similar manner That is, in Rel-15, K2 (i.e., control-channel-to-data-channel delay for PUSCH) values, which can be indicated in scheduling DCI, can be RRC-configured in a TDRA table. The gNB can ensure that all configured K2 values are greater than some minimum non-zero value. A UE can then find a minimum of all K2 values and check that it is greater than some minimum non-zero value to facilitate power saving. In Rel-16, an explicit threshold for a minimum K2 can be configured.

According to aspects of the present disclosure, it is desirable to save UE power as much as possible, while causing a minimal impact to a latency of communications. It is also desirable to take into account diverse communication environments, e.g., single or multiple XR UEs in a cell. The existing (e.g., used in Rel-15) C-DRX design does not consider specific characteristics and requirements of XR traffic. UE behavior is fixed across an entire active time duration of a DRX cycle.

In aspects of the present disclosure, with a minimum control-channel-to-data-channel delay of 1 slot, a UE may still perform physical downlink control channel (PDCCH) monitoring in each slot during periods between traffic bursts. Thus, it is desirable to develop more improvements for XR operations.

Example Scheduling Offset and Bandwidth Part Adaptation for Extended Reality

According to aspects of the present disclosure, one or more techniques may be implemented for improving downlink (DL) wireless data transfer for extended reality (XR) applications to increase power efficiency of the DL wireless data transfers and the XR applications. In aspects of the present disclosure, user equipment (UE) power saving and latency joint optimization techniques are provided that result in reduced power consumption with latency appropriate for the XR applications.

According to aspects of the present disclosure, K0 may be adapted (e.g., changed on a dynamic basis) to support XR communications.

In aspects of the present disclosure, a bandwidth of a bandwidth part (BWP) may be adapted to support XR communications.

According to aspects of the present disclosure, related configuration parameter values (e.g., K0 or bandwidth) can be configured or indicated by a network entity (e.g., a base station (BS)) based on radio resource control (RRC) signaling, medium access control—control elements (MAC-CEs), or in a downlink control information (DCI).

In aspects of the present disclosure, related configuration parameter values can be autonomously adjusted by a UE according to stages of a communication process.

In certain aspects, K0 is a slot offset between a scheduling DCI and a corresponding scheduled physical downlink shared channel (PDSCH). In aspects of the present disclosure, K0 adaptation can be realized by switching between same-slot scheduling where the scheduling DCI and the scheduled PDSCH are in the same slot (i.e., K0=0), and cross-slot scheduling where the scheduling DCI and the scheduled PDSCH are in different slots (i.e., K0>0). The same-slot scheduling results in a lower latency and a relatively higher power consumption when and the cross-slot scheduling results in a lower power consumption and a relatively higher latency.

According to aspects of the present disclosure, a BWP is a capsule of many configurations. Among the configurations is a bandwidth used for transmission and reception of a signal. A larger BWP bandwidth results in a lower latency and a relatively high power consumption when compared with a smaller BWP bandwidth that results in a lower power consumption and a relatively higher latency.

In aspects of the present disclosure, for transmissions of same information data within a hybrid automatic retransmission request (HARQ) process, K0 is set greater than 0 (i.e., cross-slot scheduling) for first M transmissions (e.g., M=1 if only a first or a new transmission) of the same information data within the HARQ process and K0 is set to 0 is used for subsequent retransmissions.

According to aspects of the present disclosure, setting K0 greater than 0 allows a UE to go to sleep (e.g., micro-sleep) after receiving a physical downlink control channel (PDCCH) without storing samples for a potential PDSCH allocation (i.e., a potential PDSCH allocation in the received PDCCH) before a scheduling PDCCH is decoded. As a result, the UE can save power with K0>0 by switching off a receiver of the UE after receiving the PDCCH.

In aspects of the present disclosure, a UE can use cross-slot scheduling for power saving when a latency requirement is not urgent for first M transmissions of same information data within a HARQ process. If the UE cannot successfully decode the first M transmissions, then a network entity switches scheduling to a same-slot scheduling to avoid additional delay in the UE receiving the transmission.

Figure 9:
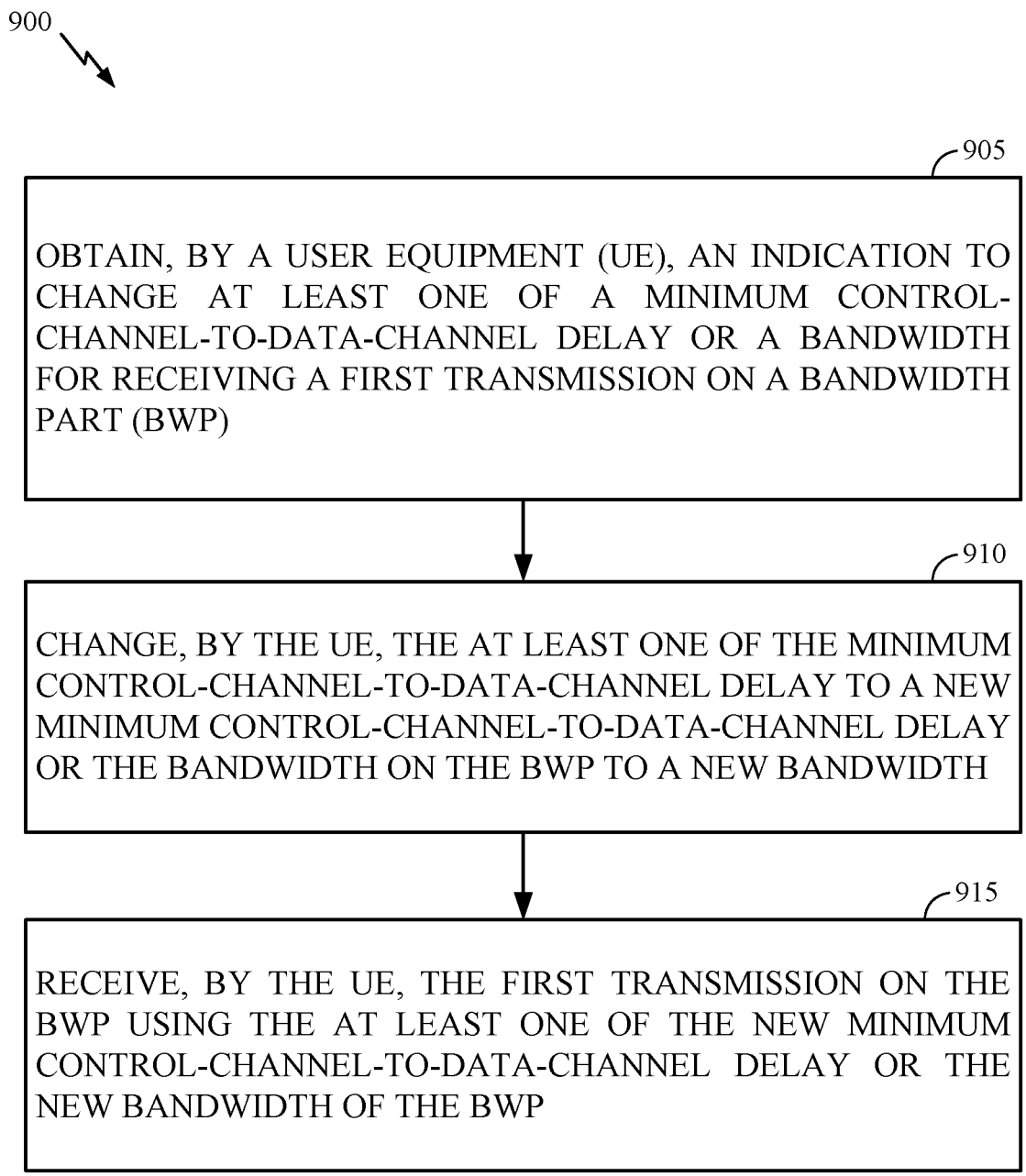
FIG. 9 is a flow diagram illustrating example operations for wireless communication by a UE, in accordance with certain aspects of the present disclosure.

FIG. 9 is a flow diagram illustrating example operations 900 for wireless communication, in accordance with certain aspects of the present disclosure. The operations 900 may be performed, for example, by a UE (e.g., such as the UE 120a in the wireless communication network 100 of FIG. 1). The operations 900 may be implemented as software components that are executed and run on one or more processors (e.g., the controller/processor 280 of FIG. 2). Further, the transmission and reception of signals by the UE in operations 900 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280) obtaining and/or outputting signals.

The operations 900 may begin, at 905, by obtaining an indication to change at least one of a minimum control-channel-to-data-channel delay or a bandwidth for receiving a first transmission on a BWP.

At 910, the UE changes the at least one of the minimum control-channel-to-data-channel delay to a new minimum control-channel-to-data-channel delay or the bandwidth on the BWP to a new bandwidth.

At 915, the UE receives the first transmission on the BWP using at least one of the new minimum control-channel-to-data-channel delay or the new bandwidth of the BWP.

In certain aspects, a UE receives a first configuration of a first BWP and a second configuration of a second BWP. The first BWP is configured for a lower traffic rate and the second BWP is configured for a higher traffic rate. The UE obtains an indication to switch from the first BWP to the second BWP. The UE switches from the first BWP to the second BWP in response to obtaining the indication.

According to aspects of the present disclosure, a UE changing at least one of a minimum control-channel-to-data-channel delay to a new minimum control-channel-to-data-channel delay may include changing from a first number of slots to a second number of slots smaller than the first number.

In aspects of the present disclosure, a UE changing a bandwidth of a BWP to a new bandwidth may include changing from a first bandwidth to a second bandwidth that is larger than the first bandwidth.

According to aspects of the present disclosure, a UE obtaining an indication may include receiving a new minimum control-channel-to-data-channel delay or a new bandwidth on a BWP in at least one of a RRC signal, a MAC-CE or a DCI.

In aspects of the present disclosure, a UE obtaining an indication may include the UE determining to change a minimum control-channel-to-data-channel delay or to change a bandwidth of a BWP.

According to aspects of the present disclosure, a UE obtaining an indication may include the UE sending a negative acknowledgment (NACK) in response to a receiving a retransmission. In some such aspects, obtaining the indication may include receiving a threshold number of retransmissions.

In aspects of the present disclosure, a UE obtaining an indication may include the UE receiving a threshold number of second transmissions. In such aspects of the present disclosure, the UE receiving the threshold number of second transmissions may include the UE receiving the threshold number of second transmissions during an active portion of a connected mode discontinuous reception (C-DRX) configuration.

Figure 10:
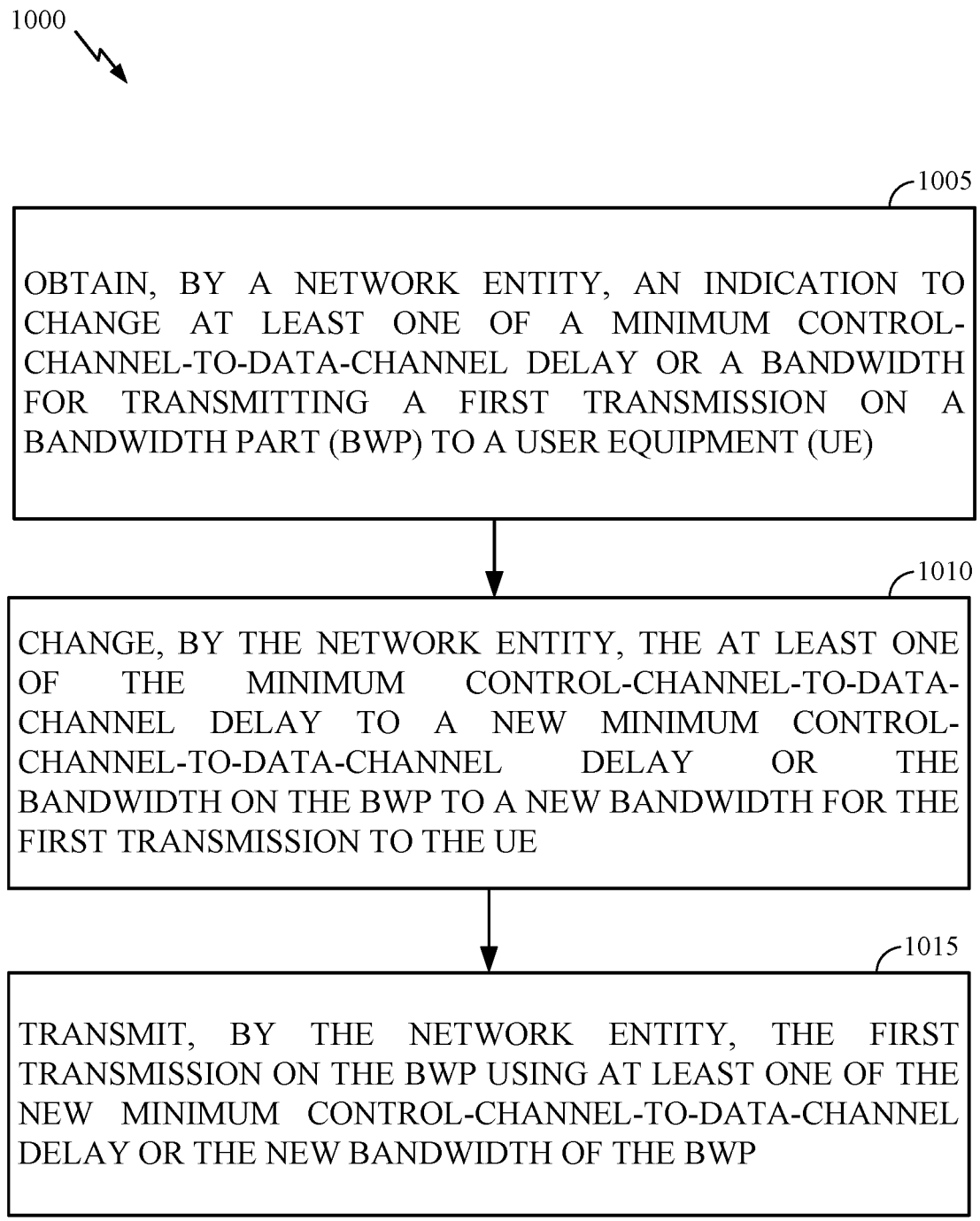
FIG. 10 is a flow diagram illustrating example operations for wireless communication by a (BS, in accordance with certain aspects of the present disclosure.

FIG. 10 is a flow diagram illustrating example operations 1000 for wireless communication, in accordance with certain aspects of the present disclosure. The operations 1000 may be performed, for example, by a network entity (e.g., such as the BS 110a in the wireless communication network 100 of FIG. 1). The operations 1000 may be complimentary to the operations 900 performed by a UE. The operations 1000 may be implemented as software components that are executed and run on one or more processors (e.g., the controller/processor 240 of FIG. 2). Further, the transmission and reception of signals by the BS in operations 900 may be enabled, for example, by one or more antennas (e.g., the antennas 234 of FIG. 2). In certain aspects, the transmission and/or reception of signals by the BS may be implemented via a bus interface of one or more processors (e.g., the controller/processor 240) obtaining and/or outputting signals.

The operations 1000 may begin, at 1005, by obtaining an indication to change at least one of a minimum control-channel-to-data-channel delay or a bandwidth for transmitting a first transmission on a BWP to a UE.

At 1010, the network entity changes the at least one of the minimum control-channel-to-data-channel delay to a new minimum control-channel-to-data-channel delay or the bandwidth on the BWP to a new bandwidth for the first transmission to the UE.

At 1015, the network entity transmits the first transmission on the BWP using at least one of the new minimum control-channel-to-data-channel delay or the new bandwidth of the BWP.

According to aspects of the present disclosure, a network entity changing at least one of a minimum control-channel-to-data-channel delay to a new minimum control-channel-to-data-channel delay may include the network entity changing from a first number of slots to a second number of slots smaller than the first number.

In aspects of the present disclosure, a network entity changing a bandwidth of a BWP to a new bandwidth may include the network entity changing from a first bandwidth to a second bandwidth larger than the first bandwidth.

According to aspects of the present disclosure, a network entity obtaining an indication may include the network entity receiving a new minimum control-channel-to-data-channel delay or a new bandwidth on a BWP in at least one of a RRC signal, a MAC-CE or a DCI.

In aspects of the present disclosure, a network entity obtaining an indication may include the network entity determining to change a minimum control-channel-to-data-channel delay or to change a bandwidth of a BWP.

According to aspects of the present disclosure, a network entity obtaining an indication may include the network entity receiving a NACK in response to transmitting a retransmission. In some such aspects, the network entity obtaining the indication may include the network entity transmitting a threshold number of retransmissions.

In aspects of the present disclosure, a network entity obtaining an indication may include the network entity transmitting a threshold number of second transmissions. In some such aspects, the network entity transmitting the threshold number of second transmissions includes the network entity transmitting the threshold number of second transmissions during an active portion of a CDRX configuration of the UE.

Figure 11:
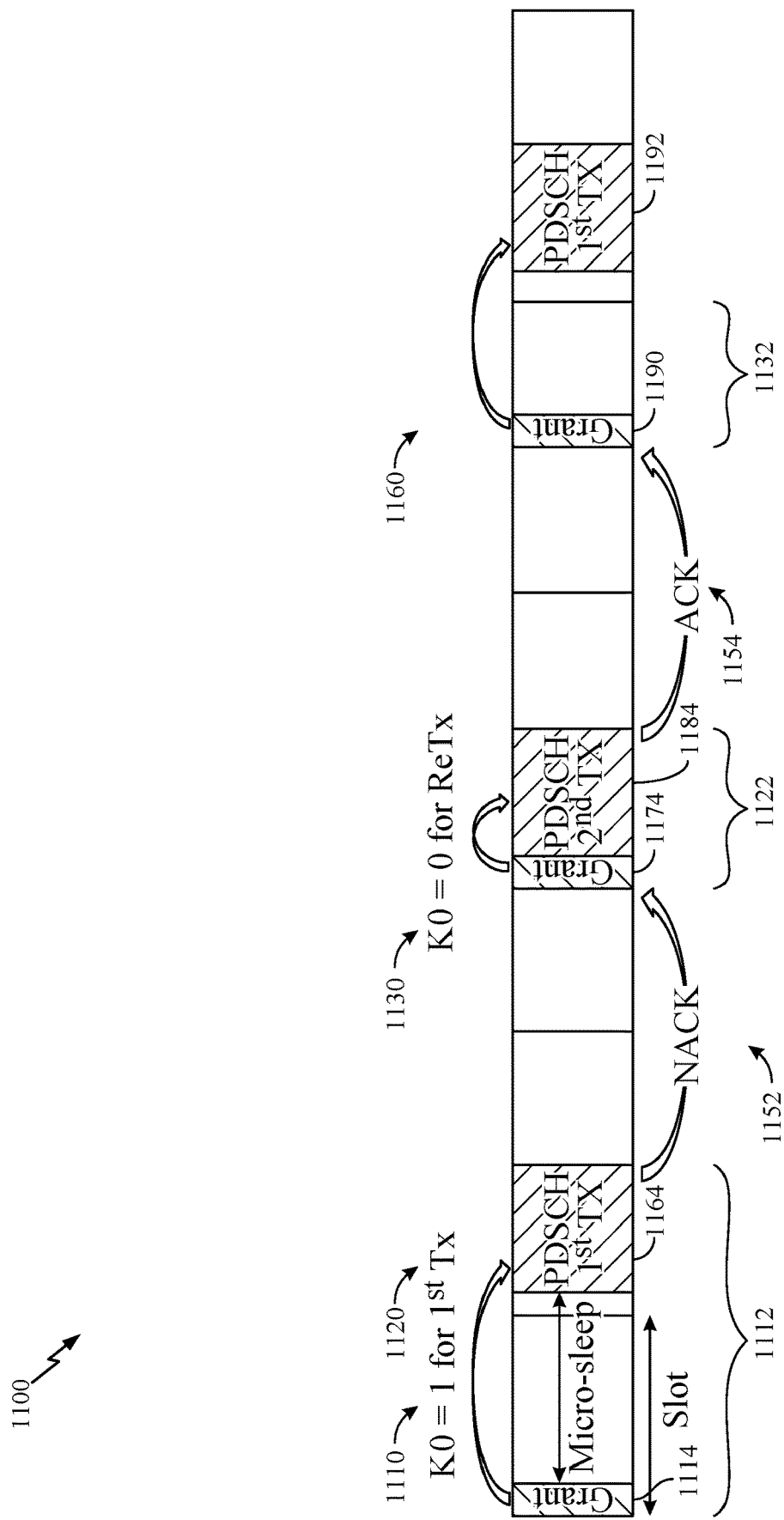
FIG. 11 shows two example transmission timelines showing a UE performing microsleep, in accordance with certain aspects of the present disclosure.

FIG. 11 shows a transmission timeline 1100 showing a UE performing microsleep, in accordance with certain aspects of the present disclosure. In the transmission timeline 1100, a cross-slot scheduling is used at 1112. Accordingly, during slots 1110 and 1120, the UE starts the micro-sleep after receiving a PDCCH, at 1114. The PDCCH conveys a grant for a first transmission ($1^{st}$ Tx) of a PDSCH 1164 to be received by the UE. The UE fails to decode the PDSCH 1164 and transmits a NACK 1152 to a network entity. In response to the NACK 1152, at 1130, K0 is changed to 0 (i.e., a same-slot scheduling) for a retransmission (ReTx). As mentioned above, K0 may be changed to 0 in response to a configuration transmitted by the network entity, or the UE may change K0 to 0 autonomously. In this example, M=1. In the slot 1122, the network entity transmits a PDCCH 1174 that conveys a grant for a PDSCH 1184 that is in the same slot (i.e., K0=0). The UE successfully decodes the PDSCH 1184 and transmits an acknowledgment (ACK) 1154. In response to the ACK 1154, K0 is changed back to 1 at 1160. At 1132, the network entity transmits a PDCCH 1190 conveying a grant for another $1^{st}$ Tx of a PDSCH 1192, which occurs one slot after the PDCCH 1190, and the UE enters the micro-sleep during the slot 1132.

In certain aspects, for each data burst, K0>0 is assumed by a UE until a first N PDSCHs (e.g., N=1) are received, i.e., the first N PDSCHs are based on a cross-slot scheduling. The UE then uses (i.e., assumes) K0=0 (i.e., a same-slot scheduling) for remaining PDSCHs of a data burst.

In certain aspects, if a UE is configured with CDRX, then each data burst may be allocated during an awake portion (i.e., CDRX active duration) by matching a CDRX cycle and an inactivity timer with a burst pattern, including an inter-burst interval and a burst duration.

In certain aspects, if C-DRX is not configured on a UE, then the UE should go to sleep (e.g., use deep sleep, light sleep, micro-sleep, or a combination) and wake up according to a burst pattern.

In certain aspects, for transmissions of same information data within a HARQ process, a bandwidth of a BWP conveying the transmissions may be set to a first value, B1, for the first L (e.g., L=1) transmissions. Then, the bandwidth may be set to a second value, B2 (e.g., B2>B1) for the subsequent retransmissions of the same information data within the HARQ process if the UE fails to decode all the first L transmissions.

In certain aspects, for each data burst, a bandwidth of a BWP conveying the data burst may be set to a first value, B1, until a first K (e.g., K=1) PDSCHs are received by the UE. Then, the bandwidth may be set to a second value, B2 (e.g., B2>B1) for the remaining PDSCHs of the data burst.

In certain aspects, a network entity and a UE may choose to adopt one or more K0 adaptation and BWP bandwidth adaption techniques and independently set related parameters (e.g., the network entity and UE s-et the parameters without communicating the change to each other).

Figure 12:
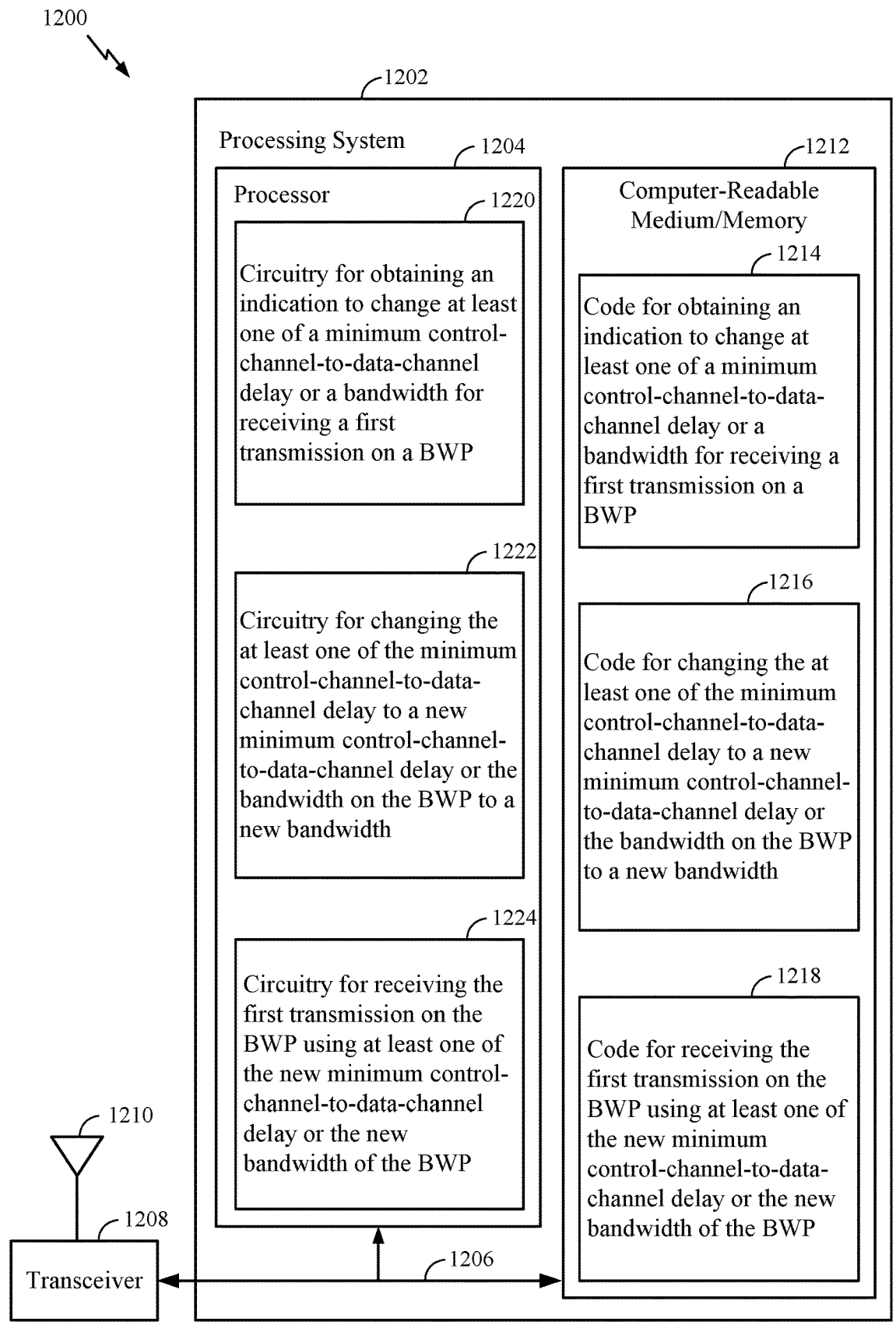
FIG. 12 illustrates a communications device that may include various components configured to perform the operations for techniques disclosed herein, in accordance with certain aspects of the present disclosure.

FIG. 12 illustrates a communications device 1200 that may include various components (e.g., corresponding to means-plus-function components) configured to perform operations for the techniques disclosed herein, such as the operations illustrated in FIG. 9. The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 9, or other operations for performing the various techniques discussed herein. In certain aspects, computer-readable medium/memory 1212 stores code 1214 for obtaining, code 1216 for changing, and code 1218 for receiving. The code 1214 for obtaining may include code for obtaining an indication to change at least one of a minimum control-channel-to-data-channel delay or a bandwidth for receiving a first transmission on a BWP. The code 1216 for changing may include code for changing the at least one of the minimum control-channel-to-data-channel delay to a new minimum control-channel-to-data-channel delay or the bandwidth on the BWP to a new bandwidth. The code 1218 for receiving may include code for receiving the first transmission on the BWP using at least one of the new minimum control-channel-to-data-channel delay or the new bandwidth of the BWP.

The processor 1204 may include circuitry configured to implement the code stored in the computer-readable medium/memory 1212, such as for performing the operations illustrated in FIG. 9, as well as other operations for performing the various techniques discussed herein. For example, the processor 1204 includes circuitry 1220 for obtaining, circuitry 1222 for changing, and circuitry 1224 for receiving. The circuitry 1220 for obtaining may include circuitry for obtaining an indication to change at least one of a minimum control-channel-to-data-channel delay or a bandwidth for receiving a first transmission on a BWP. The circuitry 1222 for changing may include circuitry for changing the at least one of the minimum control-channel-to-data-channel delay to a new minimum control-channel-to-data-channel delay or the bandwidth on the BWP to a new bandwidth. The circuitry 1224 for receiving may include circuitry for receiving the first transmission on the BWP using at least one of the new minimum control-channel-to-data-channel delay or the new bandwidth of the BWP.

Figure 13:
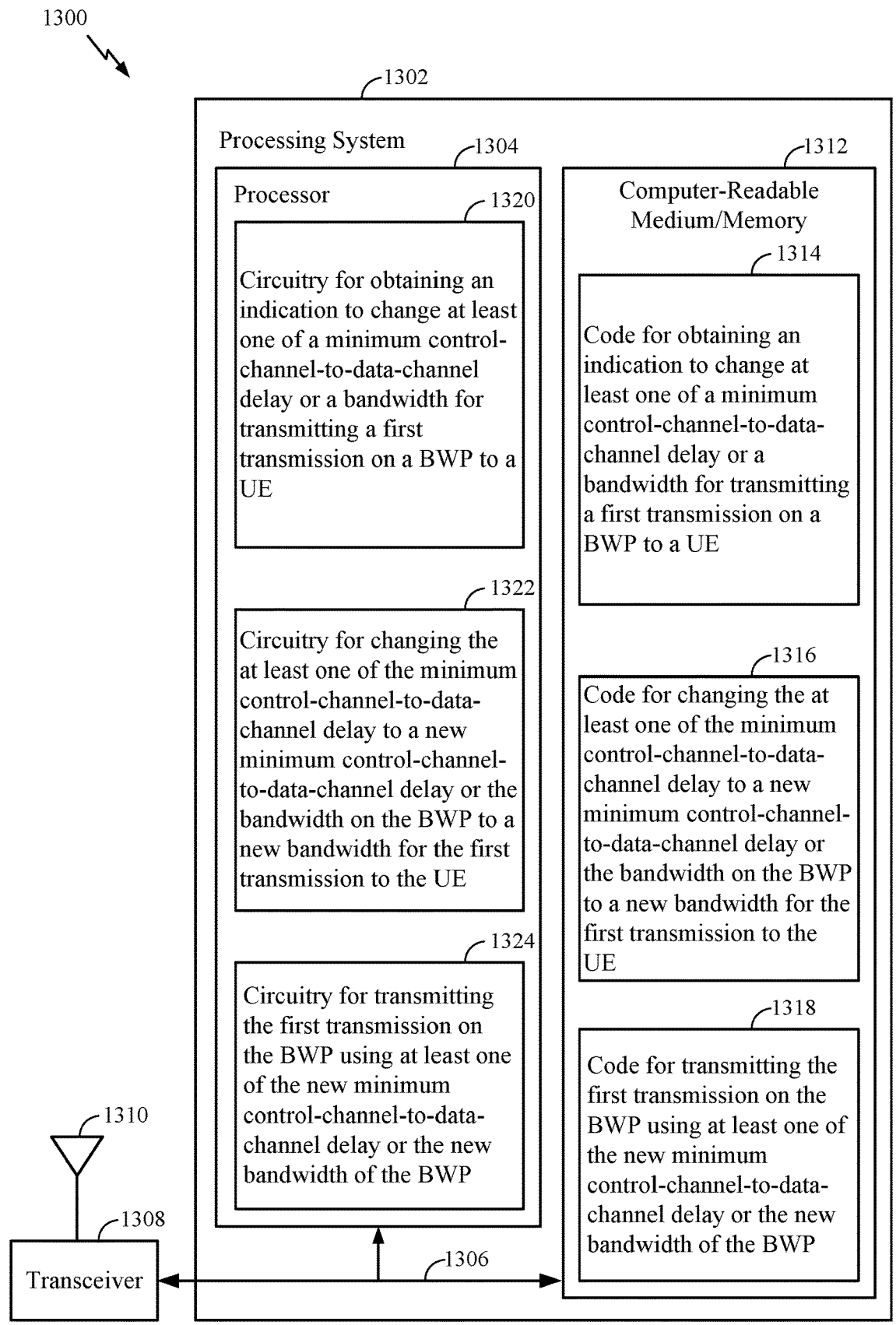
FIG. 13 illustrates a communications device that may include various components configured to perform the operations for techniques disclosed herein, in accordance with certain aspects of the present disclosure.

FIG. 13 illustrates a communications device 1300 that may include various components (e.g., corresponding to means-plus-function components) configured to perform operations for the techniques disclosed herein, such as the operations illustrated in FIG. 10. The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 10, or other operations for performing the various techniques discussed herein. In certain aspects, computer-readable medium/memory 1312 stores code 1314 for obtaining, code 1316 for changing, and code 1318 for receiving. The code 1314 for obtaining may include code for obtaining an indication to change at least one of a minimum control-channel-to-data-channel delay or a bandwidth for transmitting a first transmission on a BWP to a UE. The code 1316 for changing may include code for changing the at least one of the minimum control-channel-to-data-channel delay to a new minimum control-channel-to-data-channel delay or the bandwidth on the BWP to a new bandwidth for the first transmission to the UE. The code 1318 for transmitting may include code for transmitting the first transmission on the BWP using at least one of the new minimum control-channel-to-data-channel delay or the new bandwidth of the BWP.

The processor 1304 may include circuitry configured to implement the code stored in the computer-readable medium/memory 1312, such as for performing the operations illustrated in FIG. 10, as well as other operations for performing the various techniques discussed herein. For example, the processor 1304 includes circuitry 1320 for obtaining, circuitry 1322 for changing, and circuitry 1322 for transmitting. The circuitry 1320 for obtaining may include circuitry for obtaining an indication to change at least one of a minimum control-channel-to-data-channel delay or a bandwidth for transmitting a first transmission on a BWP to a UE. The circuitry 1322 for changing may include circuitry for changing the at least one of the minimum control-channel-to-data-channel delay to a new minimum control-channel-to-data-channel delay or the bandwidth on the BWP to a new bandwidth for the first transmission to the UE. The circuitry 1324 for transmitting may include circuitry for transmitting the first transmission on the BWP using at least one of the new minimum control-channel-to-data-channel delay or the new bandwidth of the BWP.

Example Aspects

Implementation examples are described in the following numbered aspects.

In a first aspect, a method of wireless communications by a user equipment (UE), comprising: obtaining an indication to change at least one of a minimum control-channel-to-data-channel delay or a bandwidth for receiving a first transmission on a bandwidth part (BWP); changing the at least one of the minimum control-channel-to-data-channel delay to a new minimum control-channel-to-data-channel delay or the bandwidth on the BWP to a new bandwidth; and receiving the first transmission on the BWP using at least one of the new minimum control-channel-to-data-channel delay or the new bandwidth of the BWP.

In a second aspect, alone or in combination with the first aspect, changing the at least one of the minimum control-channel-to-data-channel delay to a new minimum control-channel-to-data-channel delay comprises changing from a first number of slots to a second number of slots smaller than the first number.

In a third aspect, alone or in combination with one or more of the first and second aspects, changing the bandwidth of the BWP to the new bandwidth comprises changing from a first bandwidth to a second bandwidth larger than the first bandwidth.

In a fourth aspect, alone or in combination with one or more of the first through third aspects, obtaining the indication comprises receiving the new minimum control-channel-to-data-channel delay or the new bandwidth on the BWP in at least one of a radio resource control (RRC) signal, a medium access control—control element (MAC-CE) or a downlink control information (DCI).

In a fifth aspect, alone or in combination with one or more of the first through fourth aspects, obtaining the indication comprises determining, by the UE, to change the minimum control-channel-to-data-channel delay or to change the bandwidth of the BWP.

In a sixth aspect, alone or in combination with one or more of the first through fifth aspects, obtaining the indication comprises sending a negative acknowledgment (NACK) in response to a receiving a retransmission.

In a seventh aspect, alone or in combination with one or more of the first through sixth aspects, obtaining the indication comprises receiving a threshold number of retransmissions.

In an eighth aspect, alone or in combination with one or more of the first through seventh aspects, obtaining the indication comprises receiving a threshold number of second transmissions.

In a ninth aspect, alone or in combination with one or more of the first through eighth aspects, receiving the threshold number of second transmissions comprises receiving the threshold number of second transmissions during an active portion of a connected mode discontinuous reception (CDRX) configuration.

In a tenth aspect, a method of wireless communications by a network entity, comprising: obtaining an indication to change at least one of a minimum control-channel-to-data-channel delay or a bandwidth for transmitting a first transmission on a bandwidth part (BWP) to a user equipment (UE); changing the at least one of the minimum control-channel-to-data-channel delay to a new minimum control-channel-to-data-channel delay or the bandwidth on the BWP to a new bandwidth for the first transmission to the UE; and transmitting the first transmission on the BWP using at least one of the new minimum control-channel-to-data-channel delay or the new bandwidth of the BWP.

In an eleventh aspect, alone or in combination with the tenth aspect, changing the at least one of the minimum control-channel-to-data-channel delay to a new minimum control-channel-to-data-channel delay comprises changing from a first number of slots to a second number of slots smaller than the first number.

In a twelfth aspect, alone or in combination with one or more of the tenth and eleventh aspects, changing the bandwidth of the BWP to the new bandwidth comprises changing from a first bandwidth to a second bandwidth larger than the first bandwidth.

In a thirteenth aspect, alone or in combination with one or more of the tenth through twelfth aspects, obtaining the indication comprises receiving the new minimum control-channel-to-data-channel delay or the new bandwidth on the BWP in at least one of a radio resource control (RRC) signal, a medium access control—control element (MAC-CE) or a downlink control information (DCI).

In a fourteenth aspect, alone or in combination with one or more of the tenth through thirteenth aspects, obtaining the indication comprises determining, by the BS, to change the minimum control-channel-to-data-channel delay or to change the bandwidth of the BWP.

In a fifteenth aspect, alone or in combination with one or more of the tenth through fourteenth aspects, obtaining the indication comprises receiving a negative acknowledgment (NACK) in response to transmitting a retransmission.

In a sixteenth aspect, alone or in combination with one or more of the tenth through fifteenth aspects, obtaining the indication comprises transmitting a threshold number of retransmissions.

In a seventeenth aspect, alone or in combination with one or more of the tenth through sixteenth aspects, obtaining the indication comprises transmitting a threshold number of second transmissions.

In an eighteenth aspect, alone or in combination with one or more of the tenth through seventeenth aspects, transmitting the threshold number of second transmissions comprises transmitting the threshold number of second transmissions during an active portion of a connected mode discontinuous reception (CDRX) configuration of the UE.

An apparatus for wireless communication, comprising at least one processor; and a memory coupled to the at least one processor, the memory comprising code executable by the at least one processor to cause the apparatus to perform the method of any of the first through eighteenth aspects.

An apparatus comprising means for performing the method of any of the first through eighteenth aspects.

A computer readable medium storing computer executable code thereon for wireless communications that, when executed by at least one processor, cause an apparatus to perform the method of any of the first through eighteenth aspects.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro etc.). A BS for a pico cell may be referred to as a pico BS. A BS for a femto cell may be referred to as a femto BS or a home BS.

A UE may also be referred to as a mobile station, a terminal, an access terminal, a subscriber unit, a station, a customer premises equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smart book, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 9 and/or FIG. 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communications by a network entity, comprising:
    obtaining an indication to change a minimum control-channel-to-data-channel delay and a bandwidth for transmitting a first transmission on a bandwidth part (BWP) to a user equipment (UE);
    changing the minimum control-channel-to-data-channel delay to a new minimum control-channel-to-data-channel delay and the bandwidth on the BWP to a new bandwidth for the first transmission to the UE; and
    transmitting the first transmission on the BWP using at least one of the new minimum control-channel-to-data-channel delay or the new bandwidth of the BWP.

2. The method of claim 1, wherein the changing the minimum control-channel-to-data-channel delay to the new minimum control-channel-to-data-channel delay comprises changing from a first number of slots to a second number of slots smaller than the first number.

3. The method of claim 1, wherein the changing the bandwidth of the BWP to the new bandwidth comprises changing from a first bandwidth to a second bandwidth larger than the first bandwidth.

4. The method of claim 1, wherein the obtaining the indication comprises receiving the new minimum control-channel-to-data-channel delay and the new bandwidth on the BWP in at least one of a radio resource control (RRC) signal, a medium access control-control element (MAC-CE) or a downlink control information (DCI).

5. The method of claim 1, wherein the obtaining the indication comprises determining, by the BS, to change the minimum control-channel-to-data-channel delay and or to change the bandwidth of the BWP.

6. The method of claim 1, wherein the obtaining the indication comprises receiving a negative acknowledgment (NACK) in response to transmitting a retransmission.

7. The method of claim 6, wherein the obtaining the indication comprises transmitting a threshold number of retransmissions.

8. The method of claim 1, wherein the obtaining the indication comprises transmitting a threshold number of second transmissions.

9. The method of claim 8, wherein the transmitting the threshold number of second transmissions comprises transmitting the threshold number of second transmissions during an active portion of a connected mode discontinuous reception (CDRX) configuration of the UE.

10. An apparatus of wireless communications, comprising:
    a memory comprising instructions; and
    one or more processors configured, individually or in any combination, to execute the instructions and cause the apparatus to:
        obtain an indication to change a minimum control-channel-to-data-channel delay and a bandwidth for transmitting a first transmission on a bandwidth part (BWP) to a user equipment (UE);
        change the minimum control-channel-to-data-channel delay to a new minimum control-channel-to-data-channel delay and or the bandwidth on the BWP to a new bandwidth for the first transmission to the UE; and
        transmit the first transmission on the BWP using at least one of the new minimum control-channel-to-data-channel delay or the new bandwidth of the BWP.

11. The apparatus of claim 10, wherein the changing the minimum control-channel-to-data-channel delay to the new minimum control-channel-to-data-channel delay comprises changing from a first number of slots to a second number of slots smaller than the first number.

12. The apparatus of claim 10, wherein the changing the bandwidth of the BWP to the new bandwidth comprises changing from a first bandwidth to a second bandwidth larger than the first bandwidth.

13. The apparatus of claim 10, wherein the obtaining the indication comprises receiving the new minimum control-channel-to-data-channel delay and the new bandwidth on the BWP in at least one of a radio resource control (RRC) signal, a medium access control-control element (MAC-CE) or a downlink control information (DCI).

14. The apparatus of claim 10, wherein the obtaining the indication comprises determining to change the minimum control-channel-to-data-channel delay and to change the bandwidth of the BWP.

15. The apparatus of claim 10, wherein the obtaining the indication comprises receiving a negative acknowledgment (NACK) in response to transmitting a retransmission.

16. The apparatus of claim 15, wherein the obtaining the indication comprises transmitting a threshold number of retransmissions.

17. The apparatus of claim 10, wherein the obtaining the indication comprises transmitting a threshold number of second transmissions.

18. The apparatus of claim 17, wherein the transmitting the threshold number of second transmissions comprises transmitting the threshold number of second transmissions during an active portion of a connected mode discontinuous reception (CDRX) configuration of the UE.

19. A non-transitory computer-readable medium comprising instructions that, when executed by one or more processors of a network entity, cause the network entity to perform a method of wireless communications, comprising:

obtaining an indication to change a minimum control-channel-to-data-channel delay and a bandwidth for transmitting a first transmission on a bandwidth part (BWP) to a user equipment (UE);

changing the minimum control-channel-to-data-channel delay to a new minimum control-channel-to-data-channel delay and the bandwidth on the BWP to a new bandwidth for the first transmission to the UE; and transmitting the first transmission on the BWP using at least one of the new minimum control-channel-to-data-channel delay or the new bandwidth of the BWP.

20. The non-transitory computer-readable medium of claim 19, wherein the changing the minimum control-channel-to-data-channel delay to the new minimum control-channel-to-data-channel delay comprises changing from a first number of slots to a second number of slots smaller than the first number.

* * * * *